United States Patent Office 3,471,311
Patented Oct. 7, 1969

3,471,311
TRANSFER COMPOSITIONS
Douglas Buckley, Denby Dale, near Huddersfield, Alec Roebuck, Harpenden, and Donald Firth, Skelmanthorpe, near Huddersfield, England, assignors to Datacopy Limited, near Huddersfield, Yorkshire, England, a British company
No Drawing. Filed Feb. 15, 1967, Ser. No. 616,199
Int. Cl. B41c 1/06
U.S. Cl. 117—36.1                    18 Claims

ABSTRACT OF THE DISCLOSURE

This invention relates to transfer compositions and to sheet materials carrying such compositions which transfer sheet materials may be arranged in a stack, so that the application of an impress, for example, by a typewriter key, to one of said sheets results in the transfer of colouring matter corresponding to said impress from one sheet to an adjacent sheet in the stack. The sheets may carry a layer of a transfer composition on one side and a layer of a receptor composition on the other. The transfer composition comprises a resin soluble in a spirit, such as a modified rosin esterified pentaerythritol or a rosin maleic condensate resin, and a transferable colouring pigment and optiionally a proportion of an ethyl cellulose or ethylhydroxyethyl cellulose, and the receptor composition comprises a resin soluble in a spirit similar to that of the transfer composition together with a proportion of ethyl cellulose or ethylhydroxyethyl cellulose.

---

The present invention relates to transfer systems comprising a transfer composition and a receptor composition and has reference to such compositions when applied to a backing sheet.

Hitherto, it has been common to provide a transfer sheet having a transfer layer comprising a pressure sensitive layer containing a pigment, usually black, so that an application of pressure to a surface of the sheet as for instance under the pressure of a typewriter key, an image of the impress is transferred to a surface in contact with the transfer layer.

While these transfer sheets are perfectly satisfactory for producing copies as for instance carbon copies of typescript, they suffer from the disadvantage that when a transfer sheet is inadvertently subjected to an impression as with a ball-point pen, an image is transferred from the transfer sheet to the surface in contact with the transfer surface thereof.

Such transfer sheets can also be made up in the form of a pack, for example, for multiple invoicing, the intermediate sheets having a coating of transfer composition on the bottom surface. The coatings may be applied over the entire surfaces of the sheets or only over selected areas in patch formation so that on application of pressure from a typewriter key, the pigment will transfer from each transfer composition to the receiving surface beneath it to provide a visible image of the matter typed.

According to the present invention, there is provided a transfer system including a transfer composition and/or receptor composition in which the transfer composition comprises a resin soluble in a spirit and a transferable colouring material including a colouring pigment which is insoluble in said spirit, and in which the receptor composition comprises a spirit soluble resin together with an ethyl cellulose and/or an ethylhydroxyethyl cellulose binder, the arrangement being such that with a layer of the transfer composition adjacent a layer of the receptor composition, the application of pressure, e.g., as with a typewriter key, to one of said layers, to bring the layers into pressure contact, results in a transfer of colouring material from the layer of the transfer composition to the layer of the receptor composition.

The present invention further provides a transfer sheet system comprising a first sheet carrying a layer of a transfer composition and a second sheet carrying a layer of a receptor composition in which the transfer composition comprises a resin soluble in a spirit and a transferable colouring material including a colouring pigment which is insoluble in said spirit and in which the receptor composition comprises a spirit soluble resin together with an ethyl cellulose or ethylhydroxyethyl cellulose binder, the arrangement being such that with the first sheet arranged adjacent to the second sheet so that the layers carried on said each sheet are in contact, the application of pressure, e.g., by a typewriter key, to one of said sheets results in pressure contact between the layers and in the transfer of colouring material from the transfer composition on the first sheet to the receptor composition on the second sheet.

The resin of the transfer composition and the receptor compositions may be a modified rosin esterified pentaerythritol or a rosin maleic condensate resin for example the resin commercially available under the trade name "Bedesol 76" in which the esterifying agent is penta-erythritol or under the trade name "Crayvallac 502" in which the esterifying agent is glycerol. In the former case the ethyl cellulose or the ethylhydroxyethyl cellulose included in the composition acts as a plasticising agent to prevent the coating from becominbg brittle and breaking on folding the sheet. In the latter case, the ethyl cellulose or the ethylhydroxyethyl cellulose acts as a binding agent since the "Crayvallac 502" alone has insufficient binding power.

A suitable plasticiser is that available under the trade name "Howflex D.A.P." which is a phthalate ester of mixed aliphatic alcohols containing from 7 to 9 carbon atoms. It is preferred to mix this plasticiser with "Howflex C.S." which is cyclohexanol stearate. "Howflex C.S." is generally solid at room temperature whereas a mixture of these plasticisers is liquid at room temperature. The liquid plasticizer apparently assists transfer of the pigment from the transfer layer to the receptor layer.

Typical fillers for the transfer composition are china clay, and titanium dioxide and typical inorganic pigments are Dark Blue, Red, Black or Green (Blythe Colours Ltd.) and Mannox Blue (Hardman & Holden Ltd.). The preferred solvents for the transfer and the receptor compositions are the lower aliphatic alcohols and in particular ethanol and isopropyl alcohol.

Typical transfer compositions may be prepared by mixing 1 to 2 parts by weight of the resin with 2 to 5 parts by weight of the pigment. The mixture so formed is then dispersed in its own weight of spirit solvent for the resin and is applied by known coating means to a backing sheet. The spirit is caused or allowed to evaporate to leave the transfer composition disposed as a layer on said backing sheet.

The transfer composition may also include an organic compound having at least one functional group containing a lone electron pair such for example as benzoquinone. The transfer composition may also include a surface active agent such as "Texofor D 4" and a wax-like long chain amide such for example as "Glokemwax E 20". The latter compounds serve to prevent rubbing off of the composition when a sheet of backing material carrying the composition is handled.

The receptor composition may be of generally the same composition as the transfer composition but it is preferred to use a rosin-maleic condensate resin esterified with pentaerythritol, that is to say, a resin such as that commercially available under the trade name "Bedesol 76" and the constituents involving the transfer of pigment are omitted that is to say, the pigment and benzoquinone or equivalent compound.

However, a small amount of an opacifying agent may be included, such as, titanium dioxide which is commercially available under the trade name "Tioxide A HR" and a proportion of a plasticiser may also be incorporated which may be the same or similar in chemical composition to that used in the transfer composition. Hence, the plasticiser in the receptor layer may be typically "Howflex S.A." which is a mixture of isomeric dimethylcyclohexyl adipates.

A typical receptor composition may comprise 2.5 to 3.5 parts by weight of resin, 3.5 to 4.5 parts by weight of opacifying agent and 0.5 to 2.0 parts by weight of ethyl cellulose binder. The constituents are mixed and the resulting mixture is dispersed in its own weight of spirit solvent for the resin. The dispersion is applied by known coating means to a backing sheet so that evaporation of the spirit from the coating leaves a layer of receptor composition on the sheet. It will be appreciated that the receptor composition may be modified by the inclusion of a small proportion of oleic acid, ricinoleic acid or cetyl alcohol to enhance the receptor properties of the composition.

Either or both compositions may include a small proportion of perfume to ensure masking of any objectionable smell.

Following is a description of examples of transfer sheets and compositions in accordance with the present invention.

EXAMPLE 1

A transfer composition as made up of the following parts by weight:

| | Parts |
|---|---|
| Industrial methylated spirits 61–6 O.P. | 7.00 |
| Bedesol 76 Resin (I.C.I. Ltd.) | 1.66 |
| Dark Blue D.C. 1325 (Blythe Colours Works) | 2.66 |
| Alumina White (S.C.C. Colours Ltd.) | 1.66 |
| Howflex S.B. (Howards of Ilford) | 1.00 |

A receptor composition is made up of the following parts by weight:

| | Parts |
|---|---|
| Indudstrial methylated spirits 61–6 O.P. | 8.00 |
| Bedesol 76 Resin (I.C.I. Ltd.) | 2.85 |
| Howflex S.A. (Howards of Ilford) | 2.70 |
| Tioxide A–HR (British Titan Products) | 4.00 |
| Ethyl Cellulose type N–4 (Hercules Powder Co.) | 1.00 |

The above transfer composition is applied by known coating techniques to a sheet of paper and the receptor composition was applied in a similar manner to a second sheet of paper.

The spirit in the composition was allowed to evaporate and it was found that on placing the transfer sheet over the receptor sheet so that the layers applied thereto were in contact, an impression applied to the free face of the transfer sheet resulted in the transfer of a corresponding impression of colouring material to the receptor sheet.

On placing the transfer sheet with the transfer layer face down on a plain sheet of paper, it was found that the application of impression to the upward surface of the transfer sheet did not result in the transfer of a substantial quantity of colouring material from the sheet.

EXAMPLE 2

A transfer composition was made up of the following parts by weight:

| | Parts |
|---|---|
| Technical (99%) isopropanol | 7.00 |
| Bedesol 76 Resin (I.C.I. Ltd.) | 1.66 |
| Dark Blue D.C. 1325 (Blythe Colour Works) | 2.66 |
| Alumina White (S.C.C. Colours Ltd.) | 1.66 |
| Howflex S.B. (Howards of Ilford) | 1.00 |

A receptor composition was made up of the following parts by weight:

| | Parts |
|---|---|
| Technical (99%) isopropanol | 8.00 |
| Bedesol 76 Resin (I.C.I. Ltd.) | 2.85 |
| Howflex S.A. (Howards of Ilford) | 2.70 |
| Tioxide A HR (British Titan Products Ltd.) | 4.00 |
| Ethyl Cellulose type N–4 (Hercules Powder Co.) | 1.00 |
| Ricinoleic acid | 0.33 |

The compositions were applied to two sheets of paper as described in Example 1. Excellent transfer was obtained from the transfer sheet to the receptor sheet on applying an impression to one of said sheets as described in Example 1.

The effect of the addition of the ricinoleic acid was to increase the sensitivity of the receptor composition and to reduce any tendency of the composition to "dry out" in a dry atmosphere.

It will be appreciated from the foregoing that transfer sheets in accordance with the present invention may include a base sheet made of material other than paper, for example, the sheet may be of a textile fabric such as cotton silk, synthetic silk, nylon or "Terylene" (registered trademark) or may be of flexible plastic foil such for example as the regenerated cellulose "Cellophane" (registered trademark), polyethylene terephthalate, nylon, cellulose ester, polyvinyl chloride, polyvinylidene chloride or polyvinyl chloride-acetate copolymers.

EXAMPLE 3

The following are examples of suitable receptor compositions:

(a)

| | Parts by weight |
|---|---|
| Isopropanol TECH 99° | 51.3 |
| Bedesol 76 | 20 |
| Ethyl cellulose N4 | 4 |
| Howflex S.A. | 17.6 |
| Tioxide A–HR | 45 |
| Ricinoleic acid | 5 |

(b)

| | |
|---|---|
| Isopropanol TECH 99° | 51.3 |
| Bedesol 76 | 20 |
| Ethyl cellulose N4 | 4 |
| Howflex S.A. | 17.6 |
| Tioxide A–HR | 45 |
| Cetyl Alcohol (similar effect to reicinoleic acid) | 2.5 |

(c)

| | |
|---|---|
| Isopropanol TECH 99° | 51.3 |
| Bedesol 76 | 20 |
| Ethyl cellulose N4 | 4 |
| Howflex S.A. | 17.6 |
| Tioxide A–HR | 45 |

(d)

| | Parts by weight |
|---|---|
| Isopropanol TECH 99° | 51.3 |
| Bedesol 76 | 20 |
| Ethyl cellulose N4 | 4 |
| Howflex S.A. | 17.6 |
| Tioxide A–HR | 45 |
| Ricinoleic acid | 7.5 |

EXAMPLE 4

The following are examples of suitable transfer compositions:

(a)

| | Parts by weight |
|---|---|
| Isopropanol TECH 99° | 55.3 |
| Bedesol 76 | 15 |
| Dark Blue D.C. 1325 | 25 |
| Tioxide A–HR | 20 |
| Ethyl cellulose N4 | 1 |
| Gasil 23 | 5 |
| Howflex S.B. | 19.7 |
| Carbon black | 5 |

(b)

| | |
|---|---|
| Isopropanol TECH 99° | 59.25 |
| Ethyl cellulose N4 | 2.5 |
| Dark Blue D.C. 1325 | 25 |
| Tioxide A–HR | 25 |
| Howflex S.B. | 21.15 |
| Gasil 23 | 4 |
| Bedesol 76 | 15 |

(c)

| | |
|---|---|
| Isopropanol TECH 99° | 47.4 |
| Bedesol 76 | 16 |
| Dark Blue D.C. 1325 | 25 |
| Tioxide A–HR | 25 |
| Howflex S.B. | 17.2 |

Any of these transfer compositions can be used with any of the receptor compositions. The plasticiser Howflex S.B. is a mixture of isomeric dimethylcyclohexyl sebacates. Howflex S.A. is a mixture of isomeric dimethylcyclohexyl adipates. Gasil 23 is a silica filler supplied by J. Crosfield & Sons Ltd.

EXAMPLE 5

A transfer composition was made up from the following constituents:

| Bedesol 76, g. | 600 |
|---|---|
| Ethyl cellulose, N4, g. | 150 |
| Texofor D 4, ml. | 300 |
| Howflex D.A.P., ml. | 600 |
| China clay, g. | 1200 |
| Tioxide A–HR, g. | 600 |
| Dark Blue, g. | 1200 |
| Benzoquinone, g. | 150 |
| Howflex C.S., g. | 150 |
| Gloken E.20, ml. | 75 |

The constitutents were thoroughly mixed and the resulting mixture was dispersed in 3,500 ml. of isopropyl alcohol. The dispersion was applied as a coating to a backing sheet of paper and the solvent was flashed off by exposing the coated sheet to one or more infrared heaters to provide a layer of the transfer composition on the backing sheet.

A receptor composition was made up from the following constituents:

| Bedesol 76, g. | 600 |
|---|---|
| Ethyl cellulose, N4, g. | 150 |
| Texofor D 4, ml. | 300 |
| Gloken E.20, ml. | 600 |
| China clay, g. | 900 |
| Tioxide A–HR, g. | 1800 |

These ingredients were thoroughly mixed and the resulting mixture was dispersed in 3,500 ml. of isopropyl alcohol. The dispersion was applied as a coating to a backing sheet of paper and the solvent flashed off by use of infrared heaters directing radiant heat onto the coating to provide a layer of receptor composition on the paper.

On placing a plurality of sheets together having a receptor coating on the first face and the transfer coating on the second face, so that first and second faces of adjacent sheets are in contact, the application of pressure to the uppermost of said plurality of sheets results in the transfer of colouring material from the transfer layer to the receptor layer throughout the stack of sheets.

EXAMPLE 6

Example 5 was repeated substituting the following composition for the transfer composition of that example:

| Iospropyl alcohol, ml. | 35 |
|---|---|
| Bedesol 76, g. | 6 |
| Ethylhydroxyethyl cellulose, low viscosity grade, g. | 1.56 |
| Texofor D 4, ml. | 3 |
| Howflex D.A.P., ml. | 6 |
| China clay, g. | 12 |
| Tioxide A–HR, g. | 6 |
| Dark Blue, g. | 12 |
| Benzoquinone, g. | 1.5 |
| Howflex C.S., g. | 1.5 |
| Gloken D 20, g. | 0.75 |

It was found that excellent transfer occurred using this composition.

EXAMPLE 7

Example 6 was repeated but the 12 gm. of dark blue in the transfer composition was replaced by the following:

| | Gm. |
|---|---|
| Dark Blue | 2 |
| Vulcan 3F carbon black | 1 |
| Black DC 3544 | 10 |

EXAMPLE 8

Example 6 was repeated but the 6 gm. of Bedesol 76 was replaced by 6 gm. of Crayvallac 502.

EXAMPLE 9

Example 8 was repeated but the 1.5 gm. of ethylhydroxyethyl cellulose was replaced by 1.5 gm. of ethyl cellulose.

In each of Examples 7, 8 and 9 excellent transfer was obtained.

We claim:

1. In a transfer sheet system comprising a first sheet carrying a layer of a transfer composition and a second sheet carrying a layer of a receptor composition which with the first sheet arranged adjacent to the second sheet with the layers carried thereon in contact, the application of pressure to one of said sheets results in pressure contact between the layers and in the transfer of coloring material from the transfer composition on the first sheet to the receptor composition on the second sheet, the improvement in which the transfer composition comprises effective amounts of a spirit-soluble resin selected from the group consisting of modified rosin esterified with pentaerythritol and modified rosin esterfied with glycerol, and of a transferable coloring material including a spirit-insoluble coloring pigment, and the receptor composition comprises effective amounts of a spirit-soluble resin selected from the group consisting of modified rosin esterified with pentaerythritol and modified rosin esterified with glycerol, and of a binder selected from the group consisting of ethyl celluose and ethyl hydroxyethyl cellulose.

2. A transfer sheet system according to claim 1 in which the modified rosin is a rosin-maleic condensate.

3. A transfer sheet system according to claim 1 in which the transfer composition also contains an effective amount of a wax-like long chain amide.

4. A transfer sheet system according to claim 3 in which the transfer composition also contains an effective amount of a surface-active agent.

5. A transfer sheet system according to claim 1 in which the transfer composition also contains an effective amount of a liquid plasticizer.

6. A transfer sheet system according to claim 5 in which the plasticizer is a phthalate ester of mixed alcohols containing from 7 to 9 carbon atoms.

7. A transfer sheet system according to claim 1 in which the transfer composition also contains an effective amount of a filler selected from the group consisting of china clay and titanium dioxide, and the coloring pigment is selected from the group consisting of dark blue, red, black and green.

8. A transfer sheet system according to claim 5 in which the transfer composition also contains an effective amount of an organic compound having at least one functional group containing an electron pair.

9. A transfer sheet system according to claim 8 in which the organic compound is benzoquinone.

10. A transfer sheet system according to claim 1 in which the receptor composition also contains an effective amount of a compound selected from the group consisting of oleic acid, ricinoleic acid and cetyl alcohol.

11. A transfer sheet system according to claim 5 in which the plasticizer in the transfer composition is a mixture of di-methyl cyclohexyl sebacates and the receptor composition contains, as plasticizer, an effective amount of a mixture of isomeric di-methyl cyclohexyl adipates.

12. A transfer sheet system comprising a first sheet carrying a layer of a transfer composition and a second sheet carrying a layer of a receptor composition in which the transfer composition consists of 1 to 2 parts by weight of a spirit-soluble resin selected from the group consisting of modified rosin esterified with pentaerythritol and modified rosin esterified with glycerol, mixed with 2 to 5 parts by weight of a spirit-insoluble coloring pigment and the receptor composition consists of 2.5 to 3.5 parts by weight of a spirit-soluble resin selected from the group consisting of modified rosin esterified with pentaerythritol and modified rosin esterified with glycerol, 3.5 to 4.5 parts by weight of an opacifying agent, and 0.5 to 2.0 parts by weight of a binder selected from the group consisting of ethyl cellulose and ethyl hydroxyethyl cellulose, the sheets being capable of being arranged with the transfer layer on the first sheet adjacent the receptor layer on the second sheet and which, on the application of pressure to one of said sheets results in pressure contact between the layers and in the transfer of coloring material from the transfer composition on the first sheet to the receptor composition on the second sheet.

13. A transfer sheet system according to claim 12 in which the modified rosin is a rosin-maleic condensate.

14. A transfer sheet system according to claim 12 in which the compositions are applied to a backing sheet of substrate by dispersing each of the compositions in its own weight of solvent spirit for the resin and thereafter coating the backing sheet and permitting the spirit to evaporate leaving a coating of the receptor and transfer compositions on said sheet.

15. A transfer sheet system according to claim 14 in which the backing sheet is provided with a coating of transfer composition on the one side and with a coating of receptor composition on the other.

16. A transfer sheet system according to claim 14 in which the solvent is a lower aliphatic alcohol.

17. A transfer sheet system according to claim 16 in which the alcohol is selected from the group consisting of isopropyl alcohol and ethanol.

18. A transfer sheet system according to claim 14 in which the backing sheet is selected from the group consisting of paper, cotton, silk, synthetic silk, nylon, polyethylene terephthalate, regenerated cellulose, cellulose ester, polyvinyl chloride, polyvinylidene chloride, and polyvinyl chloride-acetate copolymers.

References Cited
UNITED STATES PATENTS

| | | | |
|---|---|---|---|
| 3,169,880 | 2/1965 | Strauss | 117—36.3 |
| 3,170,807 | 2/1965 | Fuerst | 117—36.3 |
| 3,186,862 | 6/1965 | Reuter | 117—36.3 |
| 3,203,832 | 8/1965 | Mino et al. | 117—36.3 |
| 3,256,107 | 6/1966 | Strauss | 117—36.3 |
| 3,256,108 | 6/1966 | Strauss | 117—36.3 |

MURRAY KATZ, Primary Examiner

U.S. Cl. X. R.
117—36.3, 155

PO-1050 (5/69)

UNITED STATES PATENT OFFICE
CERTIFICATE OF CORRECTION

Patent No. 3,471,311        Dated October 7, 1969

Inventor(s) Douglas BUCKLEY, Alec ROEBUCK and Donald FIRTH

It is certified that error appears in the above-identified patent and that said Letters Patent are hereby corrected as shown below:

1. Column 2, line 37, change "becominbg" to -- becoming --;

2. Column 5, lines 59 and 73, change "Gloken E.20" to -- Glokem E20 --;

3. Column 6, line 30, change "Gloken D 20" to -- Glokem E20 --;

4. Column 6, line 65, change "esterfied" to -- esterified --.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents